(12) United States Patent
Budagavi (10) Patent No.: US 9,083,984 B2
(45) Date of Patent: Jul. 14, 2015

(54) ADAPTIVE CODING STRUCTURE AND ADAPTIVE FCODE DETERMINATION IN VIDEO CODING

(75) Inventor: Madhukar Budagavi, Plano, TX (US)

(73) Assignee: TEXAS INSTRUMENTS INCORPORATED, Dallas, TX (US)

(\*) Notice: Subject to any disclaimer, the term of this patent is extended or adjusted under 35 U.S.C. 154(b) by 1103 days.

(21) Appl. No.: 12/727,864

(22) Filed: Mar. 19, 2010

(65) Prior Publication Data

US 2011/0228852 A1 Sep. 22, 2011

(51) Int. Cl.
| H04N 7/26 | (2006.01) |
| H04N 19/57 | (2014.01) |
| H04N 19/105 | (2014.01) |
| H04N 19/139 | (2014.01) |
| H04N 19/107 | (2014.01) |
| H04N 19/177 | (2014.01) |

(52) U.S. Cl.
CPC ............. *H04N 19/57* (2014.11); *H04N 19/105* (2014.11); *H04N 19/107* (2014.11); *H04N 19/139* (2014.11); *H04N 19/177* (2014.11)

(58) Field of Classification Search
CPC .................... H04N 19/00024; H04N 19/0003; H04N 19/00151; H04N 19/00284; H04N 19/00678; H04N 19/105; H04N 19/107; H04N 19/139; H04N 19/177; H04N 19/57
USPC .................................................... 375/240.16
See application file for complete search history.

(56) References Cited

U.S. PATENT DOCUMENTS

| 6,100,940 | A  | * | 8/2000  | Dieterich ...................... 348/700 |
| 6,724,821 | B1 | * | 4/2004  | Sawada .................... 375/240.16 |
| 6,950,465 | B1 | * | 9/2005  | Yokoyama et al. ...... 375/240.12 |
| 2003/0190059 | A1 | * | 10/2003 | Piccinelli et al. ............. 382/107 |
| 2006/0109906 | A1 | * | 5/2006  | Nemiroff et al. ........ 375/240.16 |
| 2007/0237232 | A1 | * | 10/2007 | Chang et al. ............. 375/240.16 |

\* cited by examiner

*Primary Examiner* — Mohammed Rahaman
(74) *Attorney, Agent, or Firm* — Mima Abyad; Frank D. Cimino (57) ABSTRACT

A method of encoding a digital video sequence is provided that includes computing a motion vector (MV) histogram and a motion threshold for a first frame of the digital video sequence, and using the MV histogram and the motion threshold for one selected from a group consisting of adaptive fcode determination and adaptive coding structure determination.

16 Claims, 6 Drawing Sheets

ADAPTIVE CODING STRUCTURE AND ADAPTIVE FCODE DETERMINATION IN VIDEO CODING

BACKGROUND OF THE INVENTION

The demand for digital video products continues to increase. Some examples of applications for digital video include video communication, security and surveillance, industrial automation, and entertainment (e.g., DV, HDTV, satellite TV, set-top boxes, Internet video streaming, digital cameras, cellular telephones, video jukeboxes, high-end displays and personal video recorders). Further, video applications are becoming increasingly mobile as a result of higher computation power in handsets, advances in battery technology, and high-speed wireless connectivity.

Video compression is an essential enabler for digital video products. Compression-decompression (CODEC) algorithms enable storage and transmission of digital video. In general, the encoding process of video compression generates coded representations of frames or subsets of frames. The encoded video bitstream, i.e., encoded video sequence, may include three types of frames: intracoded frames (I-frames), predictive coded frames (P-frames), and bi-directionally coded frames (B-frames). I-frames are coded without reference to other frames. P-frames are coded using motion compensated prediction from I-frames or P-frames. B-frames are coded using motion compensated prediction from both past and future reference frames. For encoding, all frames are divided into macroblocks, e.g., 16×16 pixels in the luminance space and 8×8 pixels in the chrominance space for the simplest sub-sampling format.

Video coding standards (e.g., MPEG, H.264, etc.) are based on the hybrid video coding technique of block motion compensation and transform coding. Block motion compensation is used to remove temporal redundancy between blocks of a frame and transform coding is used to remove spatial redundancy in the video sequence. Traditional block motion compensation schemes basically assume that objects in a scene undergo a displacement in the x- and y-directions from one frame to the next. Motion vectors are signaled from the encoder to the decoder to describe this motion. The decoder then uses the motion vectors to predict current frame data from previous reference frames.

Video encoders may use a fixed coding structure such as IPPP, IBBP, Hierarchical-P or Hierarchical-B. In the IPPP coding structure, the frames of a video sequence are encoded as an I-frame followed by some number of sequential P-frames. In the IBBP coding structure, frames of a video sequence are encoded as an I-frame followed by some number of sequential frames encoded in a pattern of two B-frames followed by a single P-frame (e.g., IBBPBBPBBP . . . ). For a given search range, if maximizing quality is the main goal, it is difficult to know which coding structure is the best as the best coding structure is sequence dependent and can vary with time. Thus, there are times during encoding of a single video sequence when one coding structure provides better quality and times when another provides better quality.

In some video encoders (e.g., MPEG-4 Simple Profile video encoders), motion vectors are coded as a combination of fixed length code and variable length code. The fixed length code (called fcode) determines the search range to be used during motion estimation. Further, fcode is an important parameter that needs to be selected correctly, especially at HD resolution. If the value of the fcode is too low, the motion vector search range is limited which can lead to significant quality degradations (1 dB or more) while coding high motion sequences. If the value of the fcode is too high, large fixed overhead may be incurred for coding motion vectors which leads to degradation in rate-distortion performance (around 0.5 dB or more). To handle these issues, video encoders typically use fcode selection techniques that depend on the amount of motion in a video sequence. For example, current MPEG-4 encoders such as xVid calculate fcode based on the variance of motion vectors. Calculation of variance involves multiplications which are expensive to implement in hardware.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein. Further, embodiments of the invention should not be considered limited to any particular video coding standard. In addition, for convenience in describing embodiments of the invention, the term frame may be used to refer to the portion of a video sequence being encoded. One of ordinary skill in the art will understand embodiments of the invention that operate on subsets of frames such as, for example, a slice, a field, a video object plane, etc.

In general, embodiments of the invention provide for adaptive coding structure determination and/or adaptive fcode determination during encoding of a video sequence. In general, in one or more embodiments of the invention, a coding structure for a consecutive sequence of frames, i.e., two or more sequential frames, in the video sequence is adaptively selected based on the level of motion in a P-frame preceding the consecutive sequence. Also, in one or more embodiments of the invention, the fcode to be used for a frame is adapted based on the level of motion in a previous frame. In some embodiments of the invention, a motion vector (MV) histogram having a small number of bins is computed during the encoding of the previous frame to record the level of motion in the frame. As is described in more detail below, the computation of MV histograms is accomplished by a low complexity technique that uses simple compares to compute the motion vector histograms.

Embodiments of adaptive fcode determination as disclosed herein reduce hardware complexity as compared to known fcode determination techniques that require expensive multiplications and have been shown in a test environment to provide a coding gain in the range of 0.10 dB to −0.01 dB (average gain of 0.014 dB). Further, embodiments of adaptive coding structure determination as described herein have been shown in a test environment to achieve an average quality gain of 0.13 dB (with a maximum quality gain of 0.73 dB and a worst quality loss of −0.18 dB).

Figure 1:
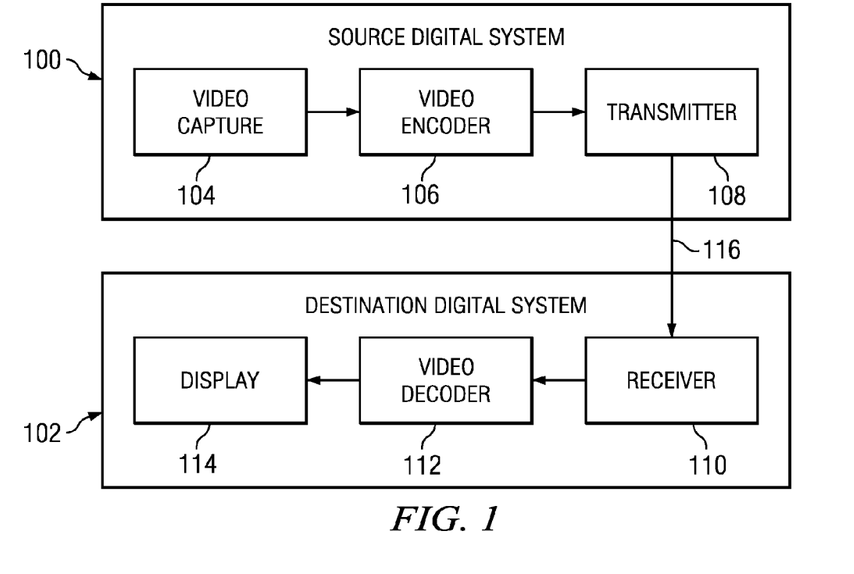
FIG. 1 shows a block diagram of a digital system in accordance with one or more embodiments of the invention.

FIG. 1 shows a block diagram of a digital system in accordance with one or more embodiments of the invention. The digital system is configured to perform coding of digital video sequences using embodiments of the methods described herein. The system includes a source digital system (100) that transmits encoded video sequences to a destination digital system (102) via a communication channel (116). The source digital system (100) includes a video capture component (104), a video encoder component (106) and a transmitter component (108). The video capture component (104) is configured to provide a video sequence to be encoded by the video encoder component (106). The video capture component (104) may be for example, a video camera, a video archive, or a video feed from a video content provider. In some embodiments of the invention, the video capture component (104) may generate computer graphics as the video sequence, or a combination of live video and computer-generated video.

The video encoder component (106) receives a video sequence from the video capture component (104) and encodes it for transmission by the transmitter component (1108). In general, the video encoder component (106) receives the video sequence from the video capture component (104) as a sequence of frames, divides the frames into coding units which may be a whole frame or a part of a frame, divides the coding units into blocks of pixels, and encodes the video data in the coding units based on these blocks. During the encoding process, a method for adaptive coding structure determination and/or a method for adaptive fcode determination in accordance with one or more of the embodiments described herein may be used. The functionality of embodiments of the video encoder component (106) is described in more detail below in reference to FIG. 2.

The transmitter component (108) transmits the encoded video data to the destination digital system (102) via the communication channel (116). The communication channel (116) may be any communication medium, or combination of communication media suitable for transmission of the encoded video sequence, such as, for example, wired or wireless communication media, a local area network, or a wide area network.

The destination digital system (102) includes a receiver component (110), a video decoder component (112) and a display component (114). The receiver component (110) receives the encoded video data from the source digital system (100) via the communication channel (116) and provides the encoded video data to the video decoder component (112) for decoding. In general, the video decoder component (112) reverses the encoding process performed by the video encoder component (106) to reconstruct the frames of the video sequence. The reconstructed video sequence may then be displayed on the display component (114). The display component (114) may be any suitable display device such as, for example, a plasma display, a liquid crystal display (LCD), a light emitting diode (LED) display, etc.

In some embodiments of the invention, the source digital system (100) may also include a receiver component and a video decoder component and/or the destination digital system (102) may include a transmitter component and a video encoder component for transmission of video sequences both directions for video steaming, video broadcasting, and video telephony. Further, the video encoder component (106) and the video decoder component (112) may perform encoding and decoding in accordance with one or more video compression standards such as, for example, the Moving Picture Experts Group (MPEG) video compression standards, e.g., MPEG-1, MPEG-2, and MPEG-4, the ITU-T video compression standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), etc. The video encoder component (106) and the video decoder component (112) may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 2:
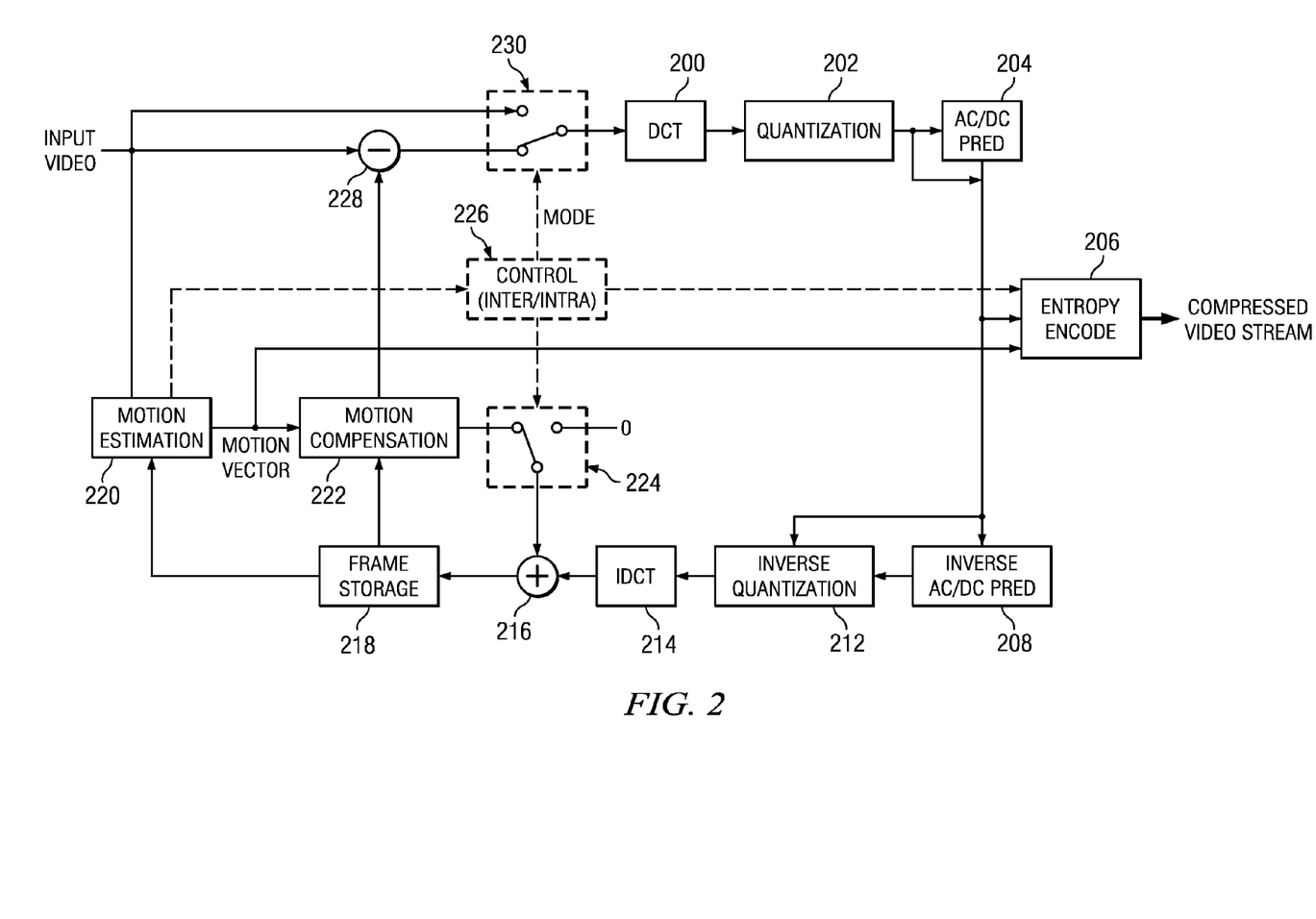
FIG. 2 shows a block diagram of a video encoder in accordance with one or more embodiments of the invention.

FIG. 2 shows a block diagram of a video encoder, e.g., the video encoder (106) of FIG. 1, in accordance with one or more embodiments of the invention. More specifically, FIG. 2 shows the basic coding architecture of an MPEG-4 video encoder configured to perform methods in accordance with one or more embodiments as described herein.

In the video encoder of FIG. 2, frames of an input digital video sequence are provided as one input of a motion estimation component (220), as one input of a mode conversion switch (230), and as one input to a combiner (228) (e.g., adder or subtractor or the like). The frame storage component (218) provides reference data to the motion estimation component (220) and to the motion compensation component (222). The reference data may include one or more previously encoded and decoded frames. The motion estimation component (220) provides motion estimation information to the motion compensation component (222), the mode control component (226), and the entropy encode component (206). More specifically, the motion estimation component (220) processes each macroblock in a frame and performs searches based on the prediction modes defined in the standard to choose the best motion vector(s)/prediction mode for each macroblock. The motion estimation component (220) provides the selected motion vector (MV) or vectors to the motion compensation component (222) and the entropy encode component (206), and the selected prediction mode to the mode control component (226).

In one or more embodiments of the invention, the motion estimation component (220) is configured to adaptively select coding structures (e.g., IPPP or IBBP) for consecutive sequences of frames based on the level of motion in a P-frame encoded prior to each consecutive sequence of frames. More specifically, the motion estimation component (220) computes an MV histogram of a final P-frame in a consecutive sequence of frames and uses the MV histogram to select the coding structure (e.g., PPP or BBP) for a subsequent consecutive sequence of frames. The motion estimation component (220) then uses the selected coding structure in selecting the prediction mode for each macroblock as the consecutive sequence of frames is encoded. A method for adaptively selecting coding structures is described in more detail below in reference to FIG. 3.

In one or more embodiments of the invention, the motion estimation component (220) is configured to adapt the fcode controlling the size of the search window used for motion estimation as a video sequence is encoded. More specifically, the motion estimation component (220) adjusts the fcode to be used for the next consecutive frame in a video sequence based on the level of motion in the current frame. The motion estimation component (220) computes an MV histogram of the current frame as the frame is encoded and then uses the MV histogram to adjust the fcode for the next frame. A method for adaptive fcode determination is described in more detail below in reference to FIG. 4.

The mode control component (226) controls the two mode conversion switches (224, 230) based on the prediction modes provided by the motion estimation component (220). When an interprediction mode is provided to the mode control component (226), the mode control component (226) sets the mode conversion switch (230) to feed the output of the combiner (228) to the DCT component (200) and sets the mode conversion switch (224) to feed the output of the motion compensation component (222) to the combiner (216). When an intraprediction mode is provided to the mode control component (226), the mode control component (226) sets the mode conversion switch (230) to feed input frames to the DCT component (200) and sets the mode conversion switch (224) to feed the output of the motion compensation component (222) to a null output.

The motion compensation component (222) provides motion compensated prediction information based on the motion vectors received from the motion estimation component (220) as one input to the combiner (228) and to the mode conversion switch (224). The motion compensated prediction information includes motion compensated interframe macroblocks, i.e., prediction macroblocks. The combiner (228) subtracts the selected prediction macroblock from the current macroblock of the current input frame to provide a residual macroblock to the mode conversion switch (230). The resulting residual macroblock is a set of pixel difference values that quantify differences between pixel values of the original macroblock and the prediction macroblock.

The mode conversion switch (203) then provides either the residual macroblock or the current macroblock to the DCT component (200) based on the current prediction mode. The DCT component (200) performs a block transform, e.g., discrete cosine transform (DCT), on the macroblock and outputs the transform result. The transform result is provided to a quantization component (202) which outputs quantized transform coefficients. The quantized transform coefficients are provided to the DC/AC (Discrete Coefficient/Alternative Coefficient) prediction component (204). AC is typically defined as a DCT coefficient for which the frequency in one or both dimensions is non-zero (higher frequency). DC is typically defined as a DCT coefficient for which the frequency is zero (low frequency) in both dimensions.

The DC/AC prediction component (204) predicts the AC and DC for the current macroblock based on AC and DC values of adjacent macroblocks such as an adjacent left top macroblock, a top macroblock, and an adjacent left macroblock. More specifically, the DC/AC prediction component (204) calculates predictor coefficients from quantized coefficients of neighboring macroblocks and then outputs the differentiation of the quantized coefficients of the current macroblock and the predictor coefficients. The differentiation of the quantized coefficients is provided to the entropy encode component (206), which encodes them and provides a compressed video bit stream for transmission or storage. The entropy coding performed by the entropy encode component (206) may be any suitable entropy encoding techniques, such as, for example, context adaptive variable length coding (CAVLC), context adaptive binary arithmetic coding (CABAC), run length coding, etc.

Inside every encoder is an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent frames. To determine the reconstructed input, the quantized transform coefficients from the quantization component (202) are provided to an inverse quantize component (212) which outputs estimated transformed information, i.e., an estimated or reconstructed version of the transform result from the DCT component (200). The estimated transformed information is provided to the inverse DCT component (214), which outputs estimated residual information which represents a reconstructed version of the residual macroblock. The reconstructed residual macroblock is provided to a combiner (216). The combiner (216) adds the predicted macroblock from the motion compensation component (222) (if available) to the reconstructed residual macroblock to generate an unfiltered reconstructed macroblock, which becomes part of reconstructed frame information. The reconstructed frame information, i.e., reference frame, is stored in the frame storage component (218) which provides the reconstructed frame information as reference frames to the motion estimation component (220) and the motion compensation component (222).

Figure 3:
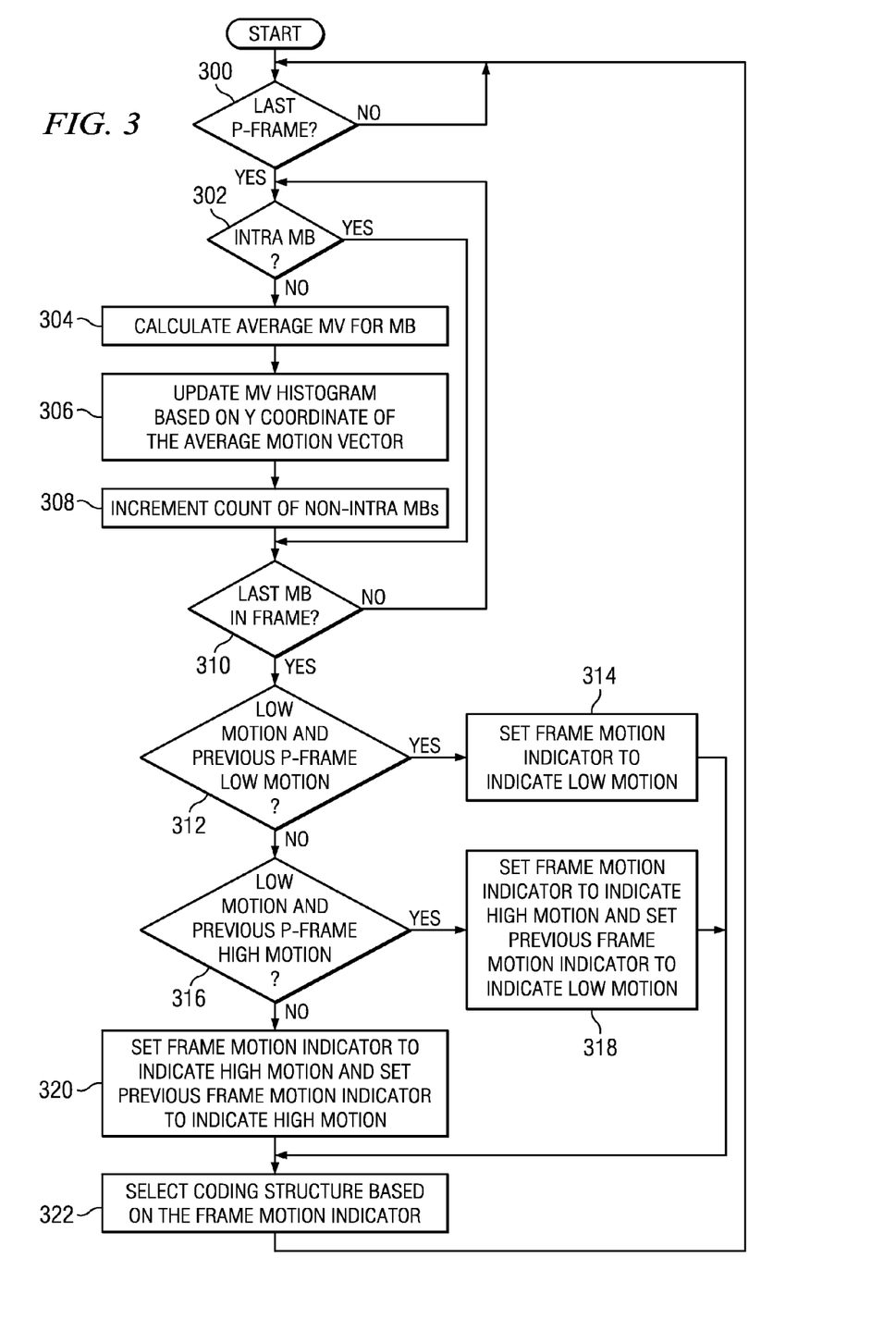
FIGS. 3 and 4 show flow diagrams of methods in accordance with one or more embodiments of the invention.

FIG. 3 shows a flow graph of a method for adaptive coding structure selection during coding of a digital video sequence in accordance with one or more embodiments of the invention. As was previously mentioned, some video encoders may use fixed coding structures such as, for example, IPPP and IBBP. IPPP and IBBP are merely examples and other coding structures may be used in embodiments of the invention. Embodiments of the method allow for the adaptive selection of a coding structure for a consecutive sequence of two or more frames based on the level of motion in the last P-frame of the previous encoded sequence of frames. For example, in an embodiment of the method, the encoding of an initial consecutive sequence of four frames may be IBBP and the encoding of the next consecutive sequence of three frames may be BBP or may be changed to PPP based on the level of motion in the final P-frame of the initial consecutive sequence.

In general, the method of FIG. 3 computes a motion vector (MV) histogram for the final P-frame in a consecutive sequence of frames, referred to in this description as the current P-frame, being encoded using a particular coding structure. The MV histogram is then used to determine the level of motion in the current P-frame. The level of motion (e.g., high or low) of the current P-frame and the level of motion in the final P-frame in the previous consecutive sequence of frames, referred to in this description as the previous P-frame, are then used to select the coding structure for the next consecutive sequence of frames.

More specifically, a motion vector (MV) histogram is computed for the current P-frame. (300-310). To compute the MV histogram, for each non-intracoded macroblock in the P-frame (302), a mean motion vector (MV) for the macroblock is computed (304). That is, the mean x coordinate and the mean y coordinate of the motion vectors computed during motion estimation for the macroblock are determined. As is known in the art, during motion estimation, motion vectors may be computed for sub-blocks of a macroblock. The mean x coordinate for a macroblock may be computed as the sum of the x coordinates of these motion vectors divided by the number of motion vectors. The mean y coordinate may be similarly computed. For example, a 16×16 macroblock may have sixteen motion vectors computed during motion estimation, one for each 4×4 sub-block. The mean x coordinate would be the sum of the x coordinates of the 16 MVs divided by 16.

The MV histogram is then updated based on the y coordinate of the mean motion vector (306). In one or more embodiments of the invention, the MV histogram has one bin and records a count of the inter-coded macroblocks in the P-frame with a mean y coordinate that exceeds a threshold value. The value of the threshold may be empirically determined and may vary depending on the maximum search range in the y direction used for motion estimation. For example, if the maximum search range is +/−32 in the y direction, the threshold may be 8. A count of the number of non-intracoded MBs in the P-frame is also incremented (308).

Once the MV histogram is computed, the coding structure for the next consecutive sequence of frames is selected based on the level of motion in the current P-frame as indicated by the MV histogram and the level of motion in the previous P-frame (312-322). The MV histogram indicates the level of motion in the current P-frame is low if the number of MBs recorded in the MV histogram divided by the total number of inter-coded macroblocks in the frame is less than a motion threshold value. Otherwise, the level of motion in the current P-frame is considered to be high. The value of the motion threshold may be empirically determined and may vary depending on the maximum search range in the y direction used for motion estimation. For example, if the maximum search range is +/−32 in the y direction, the motion threshold may be 0.04.

If the level of motion in the current P-frame is low and the level of motion in the previous P-frame was also low (312), then a frame motion indicator is set to indicate low motion (314). Otherwise, if the level of motion in the current P-frame is low and the level of motion in the previous P-frame was high (316), then the frame motion indicator is set to indicate high motion and an indicator of previous frame motion is set to indicate low motion (318). Otherwise, the frame motion indicator is set to indicate high motion and the indicator of previous frame motion is also set to indicate high motion (320). The coding structure is then selected based on the frame motion indicator. In one or more embodiments of the invention, if the frame motion indicator indicates low motion, BBP is selected as the coding structure for the next consecutive sequence of frames. Otherwise, PPP is selected as the coding structure.

Figure 4:
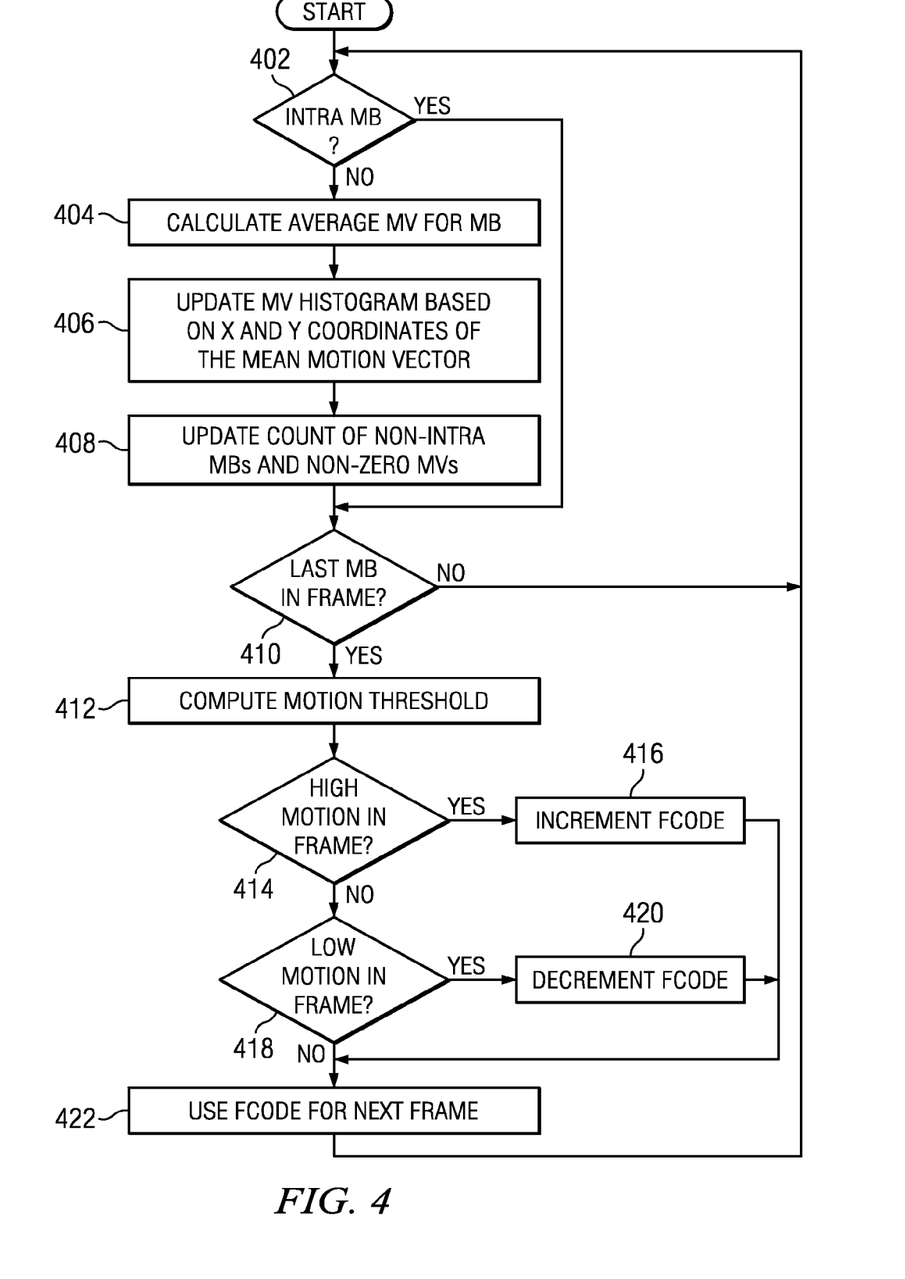

FIG. 4 shows a flow graph of a method for adaptive fcode determination during coding of a digital video sequence in accordance with one or more embodiments of the invention. As was previously mentioned, the search range used for motion estimation in a frame is determined by an fcode in some video encoders. The value of the fcode may be a small integer value in a range of permitted values where each integer in the range of permitted values represents a permissible search range. For example, in MPEG-4 video encoders, the value of the fcode may range from 1 to 7. Embodiments of the method allow the value of the fcode to be adapted (within the range of permitted values for the video encoder) for the next P-frame in a video sequence based on the level of motion (e.g., high or low) in the P-frame being encoded.

In general, the method of FIG. 4 computes a motion vector (MV) histogram for a P-frame of the video sequence, referred to in this description as the current frame, as the P-frame is being encoded. The MV histogram is then used to determine the level of motion in the current frame. If the level of motion is high, the fcode is incremented. If the level of motion is low, the fcode is decremented. Otherwise, the fcode is not changed. The resulting fcode is then used for motion estimation during encoding of the next P-frame.

More specifically, a motion vector (MV) histogram is computed for the current frame (402-410). To compute the MV histogram, for each non-intracoded macroblock in the current frame (402), a mean motion vector (MV) for the macroblock is computed (404). The MV histogram is then updated based on the x and y coordinates of the mean motion vector (406). In one or more embodiments of the invention, the MV histogram has four bins and records counts of the inter-coded macroblocks in the current frame with a mean y coordinate that exceeds a lower threshold value and/or an upper threshold value and/or with a mean x coordinate that exceeds one or both of the two threshold values. In other words, one bin of the MV histogram records the count of the number of inter-coded MBs with a mean y coordinate exceeding the lower threshold, another bin records the count of the number of inter-coded MBs with a mean y coordinate exceeding the upper threshold, etc. The values of the two thresholds may be adapted for each P-frame based on the fcode value used for the previous P-frame. An example of adapting the two thresholds is shown in the pseudo code of Tables 1-5 below. Counts of the number of non-intracoded MBs and the number of non-zero motion vectors in the current frame are also incremented (408).

Once the MV histogram is computed, a motion threshold is computed (412). In some embodiments of the invention, the motion threshold is computed based on the number of non-intracoded MBs and the number of non-zero motion vectors in the current frame. For example, if the number of non-zero motion vectors is greater than an empirically determined percentage (e.g., 40%) of the total number of macroblocks in the frame, the motion threshold is set to an empirically determined percentage (e.g., 1%) of the number of non-intracoded MBs. Otherwise, the motion threshold is set to another empirically determined percentage (e.g., 4%) of the number of non-intracoded MBs.

If there is high motion in the current frame (414), then the fcode is incremented for the next P-frame (416). Although not specifically shown in FIG. 4, the fcode will not be incremented if the maximum fcode value has been reached. High motion may be indicated, for example, if the value in the bin of the MV histogram representing the number of inter-coded macroblocks having a mean x coordinate greater than the upper threshold exceeds the motion threshold or if the value in the bin of the MV histogram representing the number of inter-coded macroblocks having a mean y coordinate greater than the upper threshold exceeds the motion threshold.

Otherwise, if there is low motion in the current frame (418), the fcode is decremented for the next P-frame (420). Although not specifically shown in FIG. 4, the fcode will not be decremented if the minimum fcode value has been reached. Low motion may be indicated, for example, if the value in the bin of the MV histogram representing the number of inter-coded macroblocks having a mean x coordinate greater than the lower threshold is less than the motion threshold and the value in the bin of the MV histogram representing the number of inter-coded macroblocks having a mean y coordinate greater than the lower threshold is less than the motion threshold. Otherwise, the fcode is not changed. The resulting fcode is then used for motion estimation in the next P-frame (422).

Tables 1-5 are pseudo code listings illustrating methods for adaptive coding structure selection and adaptive fcode determination during coding of a digital video sequence in accordance with one or more embodiments of the invention. The pseudo code uses the semantics of the C programming language. In the pseudo code, a 16×16 macroblock is assumed that can have sixteen motion vectors, one for each 4×4 sub-block of the macroblock. Table 1 provides definitions of the global variables used in the pseudo code of Tables 2-5. A brief overview is provided for the operation of the pseudo code in each of Tables 2-5. One of ordinary skill in the art will be able to understand the pseudo code in each table with reference to the brief explanation, Table 1, the above descriptions of FIGS. 3 and 4, and the comments embedded in the pseudo code.

Table 2 illustrates macroblock level processing performed for each macro block in a frame and Table 3 illustrates frame level processing. In other words, to compute the MV histogram of a frame, the pseudo code of Table 2 is called for each macroblock in the frame and the pseudo code of Table 3 is called once for the frame. Note that the pseudo code of Table 2 computes the MV histogram using the GMV of a previous frame. This pseudo code also computes an initial estimate of the GMV, i.e., gmvxCurr and gmvyCurr, for the frame being processed.

Although not specifically shown in this pseudo code of Table 2, gmvxCurr, gmvyCurr, and numNonIntraMBs are calculated just for P frames. The pseudo code of Table 3 appropriately scales gmvxCurr and gmvyCurr for use as global motion vectors for P-frames. Further, the pseudo code of Table 3 illustrates calculating the y coordinate of the global motion vector. The result, gmvY0, is used as gmvyPrev for the next P frame processed by the pseudo code of Table 2. The x coordinate of the GMV may be similarly calculated.

The pseudo code of Table 3 basically normalizes the GMV by the temporal distance between frames. For example, let the mean motion in P frame P1 be 10 pixels in the y direction. Then, the actual GMV between a previous P frame P0 and P1 is GMV1=10. P0 and P1 are one clock tick apart. The next P frame P2 and P1 are two clock ticks apart. Since P2 uses the mean motion vector of the previous frame as an estimate of global motion between P2 and P1, the GMV of P1 needs to be scaled by a factor of two to compensate for the increased temporal distance between P2 and P1. In the pseudo code of Table 3, prevPPD is the previous frame to frame temporal distance and fwdD is the temporal distance between the current frame and the previous frame. So, the GMV for the current frame is calculated as:

avgMotionVector*fwD/prevPPD when
avgMotionVector=gmvyCurr/numNonIntraMBs.

TABLE 1

| | |
|---|---|
| gmvxPrev | Global motion vector from previous frame - x coordinate |
| gmvyPrev | Global motion vector from previous frame - y coordinate |
| gmvxCurr | Global motion vector for current frame - x coordinate |
| gmvyCurr | Global motion vector for current frame - y coordinate |
| mvx[4][4] | Motion vectors in quarter pel resolution - x coordinate |
| mvy[4][4] | Motion vectors in quarter pel resolution - y coordinate |
| mvRange1 | First motion vector threshold to compare against |
| mvRange2 | Second motion vector threshold to compare against |
| intra | Flag to indicate whether current macroblock is intra-coded |
| numNonIntraMBs | Number of inter-coded macroblocks in a frame |
| numNonZeroMV | Number of non-zero motion vectors in a frame (used for fcode adaptation) |
| cHistX1, cHistX2, cHistY1, cHistY2 | MV histogram values |
| prevFrameLowMotion | Indicates level of motion in previous P frame (used for coding structure adaptation) |
| srY | Indicates which coding structure to use (used for coding structure adaptation) |
| vopFcodeForwardPrev | Fcode of previous frame (used for fcode adaptation) |
| vopFcodeForward | Fcode to use for the current frame (used for fcode adaptation) |

Tables 2 and 3 show pseudo code for MV histogram computation with removal of the bias of using a global motion vector (GMV) for motion estimation. More specifically,

TABLE 2

```
if(intra) {
    // Do nothing
}
else {
    // Calculate mean motion vector
    avgmvx = 0;avgmvy = 0;
    nonZeroMV = 1;
    for(i = 0;i < 4;++i) {
        for(j = 0;j < 4;++j) {
            avgmvx += mvx[i][j];
            avgmvy += mvy[i][j];
            if(mvx[i][j] || mvy[i][j])
                nonZeroMV = 0;
        }
    }
    // Right shift by 4 to mean mvx and mvy. Another right shift by 2 to change
    // MV resolution to full-pel
    avgmvx = (avgmvx) >> 6;
    avgmvy = (avgmvy) >> 6;
    // Calculate global motion vector for frame (to be used for histogram
    of next frame)
    gmvxCurr += avgmvx;
    gmvyCurr += avgmvy;
    // Calculate MV histogram values after removing GMV bias from
    mean motion
    // vector
    absmvx = abs(avgmvx-gmvxPrev);
    absmvy = abs(avgmvy-gmvyPrev);
    if(absmvx > mvRange1) cHistX1 = cHistX1 + 1;
    if(absmvx > mvRange2) cHistX2 = cHistX2 + 1;
    if(absmvy > mvRange1) cHistY1 = cHistY1 + 1;
    if(absmvy > mvRange2) cHistY2 = cHistY2 + 1;
    // Count number of inter-coded macroblocks in frame
```

TABLE 2-continued

```
    numNonIntraMBs = numNonIntraMBs + 1;
    // Count number of non-zero motion vectors in frame
    if(nonZeroMV)
        numNonZeroMV = numNonZeroMV + 1;
}
```

TABLE 3

```
//
// Input:
// gmvyCurr: Global motion vector for P frame - y coordinate
// numNonIntraMBs: Number of inter-coded macroblocks in P frame
// prevPPD: Timestamp difference between previous P picture and
previous-previous P picture
// fwdD: Difference between current P picture timestamp and previous P
picture timestamp;
// Output:
// gmvY0: Forward global motion vector y coordinate
//
void CalculateGlobalOffsetY(S32 gmvyCurr,
                            S32 numNonIntraMBs,
                            S32 *gmvY0
                            S32 *prevPPD
                            S32 fwdD)
{
    *gmvY0 = 0;
    // Calculate global offset in Y direction
    if((numNonIntraMBs*(*prevPPD)) != 0)
        *gmvY0 = (gmvyCurr*fwdD)/(numNonIntraMBs*(*prevPPD));
    else
        *gmvY0 = 0;
    //Store PPD for future use
    *prevPPD = fwdD;
} // end CalculateGlobalOffsetY( )
```

Table 4 shows pseudo code illustrating adaptive coding structure determination. This pseudo code assumes that two coding structures are supported by a video encoder, IPPP and IBBP. The pseudo code is executed after three consecutive frames are coded using one of the two coding structures to determine which coding structure is to be used for the next three consecutive frames. In general, the PPP coding structure is used when motion is high between the final P frame of the previously coded three consecutive frames and the final P frame of the currently coded three consecutive frames and the BBP coding structure is used when motion is low. For example, if a sequence of seven frames is encoded as $I_1xxP_1xxP_2$, the PPP coding structure is used for the next three frames if the motion between $P_1$ and $P_2$ is high and the BBP coding structure is used if the motion is low.

The pseudo code of Table 4 assumes that an MV histogram has been computed for the final P frame of the three consecutive frames. While this pseudo code considers motion in the y direction, one of ordinary skill in the art will understand embodiments of the invention that consider motion in the x direction and/or in both directions. For purposes of computing the MV histogram, the pseudo code of Table 2 is called for each macroblock in the final P frame with an empirically determined value for mvRange1 (e.g., 8). The value of mvRange2 does not matter. Further, the value of threshold) (the motion threshold) is assumed to be a small empirically determined value (e.g., 0.04). The values of mvRange1 and threshold1 may be different depending on the maximum search range in the y direction used by the video encoder. The example values assume a maximum search range of +/−32 in the y direction.

In the pseudo code, if the percentage of mean y coordinates in inter-coded MBs of the P frame being processed (p12/numNonIntraMBs) is greater than mvRange1 (as computed by the MV histogram) is less than the small motion threshold, threshold1, the level of motion is considered to be low; otherwise, the level of motion is considered to be high. The variable prevFrameLowMotion is set to 0 at the beginning of the video sequence and is used to introduce hysteresis into the choice of coding structure by allowing for gradual tracking of motion activity. If the value of prevFrameLowMotion is 1, the motion in the previously considered P frame (e.g., $P_1$ in the above example) was determined to be low; if the value is 0, the motion in the previously considered P frame was determined to be high. If the value of srY is 0 after the pseudo code is executed, the BBP coding structure is used for the next three frames; otherwise, the PPP coding structure is used for the next three frames.

TABLE 4

```
if(numNonIntraMBs != 0) {
    p12 = cHistY1; // Histogram value cHistY1 used here
}
else {
    p12 = numNonIntraMBs;
}
if(p12 < THRESHOLD1*numNonIntraMBs) {
    // Low motion
    if(prevFrameLowMotion) {
        srY = 0;
    }
    else {
        // current frame motion is low, but previous frame motion was high.
        // continue signaling of high motion for one more iteration
        prevFrameLowMotion = 1;
        srY = 1;
    }
}
else {
    // High motion
    prevFrameLowMotion = 0;
    srY = 1;
}
```

Table 5 shows pseudo code illustrating adaptive fcode determination. In general, the pseudo code increases the fcode for the current P-frame if the motion in the previous P-frame was high and decreases the fcode for the current P-frame if the motion in the previous P-frame is low. Further, the fcode can have a value from 1 to 6. The pseudo code assumes that an MV histogram has been computed for the previous P-frame. For purposes of computing the MV histogram, the pseudo code of Table 2 is called for each macroblock in the previous P-frame with values of mvRange1 and mvRange2 calculated based on the fcode used for the previous P-frame. More specifically, mvRange1 is computed as 4*((16<<(vopFcodeForwardPrev−2))−4) and mvRange2 is computed as 4*((16<<(vopFcodeForwardPrev−1))−8) where vopFcodeForwardPrev is the fcode used for the previous P-frame. The constants in these computations may change if the size of the macroblock changes. These constants assume a 16×16 macroblock.

The pseudo code also computes an adaptive motion threshold, thresh, used to determine if the motion is high or low. This motion threshold is computed based on the number of non-intracoded MBs and the number of non-zero motion vectors in the previous P-frame. More specifically, if the number of non-zero motion vectors is greater than 40% of the total number of macroblocks in the frame, the motion threshold is set to 1% of the number of non-intracoded MBs. Otherwise, the motion threshold is set to 4% of the number of non-intracoded MBs. The percentages used in this pseudo code are empirically determined and may change if the size of the macroblock changes. These percentages assume a 16×16 macroblock.

TABLE 5

```
// thresh - Adaptive motion threshold
// numMBs - Number of macroblocks in frame
if (numNonZeroMV > 0.4*numMBs)
      thresh = 1*numNonIntraMBs /100; // thresh = 1% of
      numNonIntraMBs
else
      thresh = 4*numNonIntraMBs /100; // thresh = 4% of
      numNonIntraMBs
// (cHistX1 < thresh && cHistY1 < thresh) signals low motion
// (cHistX2 > thresh || cHistY2 > thresh) signals high motion
// Update Fcode
if(vopFcodeForwardPrev == 1) {
      if(cHistX2 > thresh || cHistY2 > thresh) // high motion check
         vopFcodeForward = 2; // increment fcode when high motion
}
else if(vopFcodeForwardPrev == 2) {
      if(cHistX1 < thresh && cHistY1 < thresh) // low motion check
         vopFcodeForward = 1; // decrement fcode when low motion
      else if(cHistX2 > thresh || cHistY2 > thresh) // high motion check
         vopFcodeForward = 3; // increment fcode when high motion
}
else if(vopFcodeForwardPrev > 2) {
      if(cHistX1 < thresh && cHistY1 < thresh) // low motion check
         vopFcodeForward--; // decrement fcode when low motion
      else if(cHistX2 > thresh || cHistY2 > thresh) // high motion check
         vopFcodeForward++; // increment fcode when high motion
}
if(vopFcodeForward > 6) vopFcodeForward = 6;
```

Embodiments of the encoders and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 5:
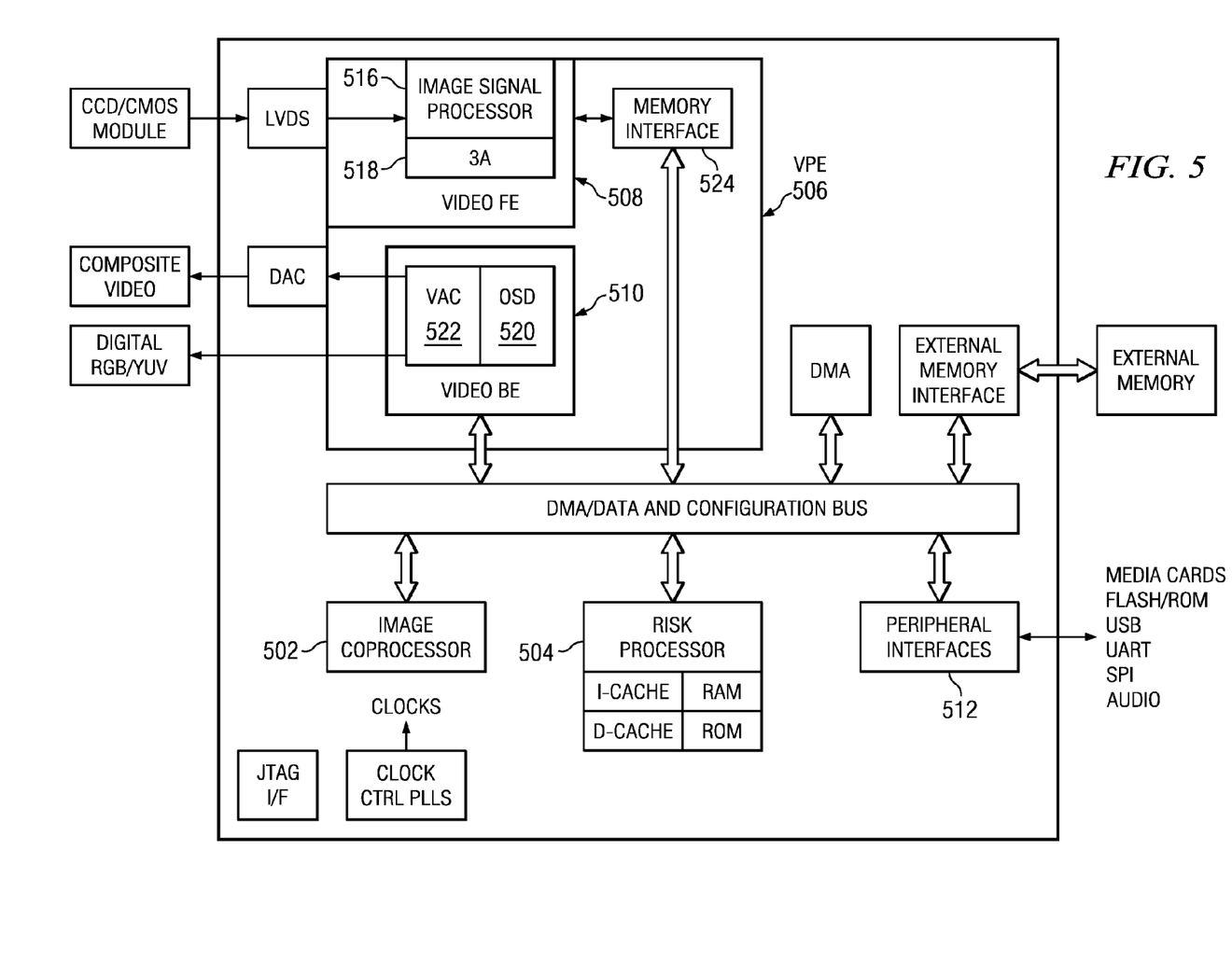
FIGS. 5-7 show illustrative digital systems in accordance with one or more embodiments of the invention.
Figure 6:
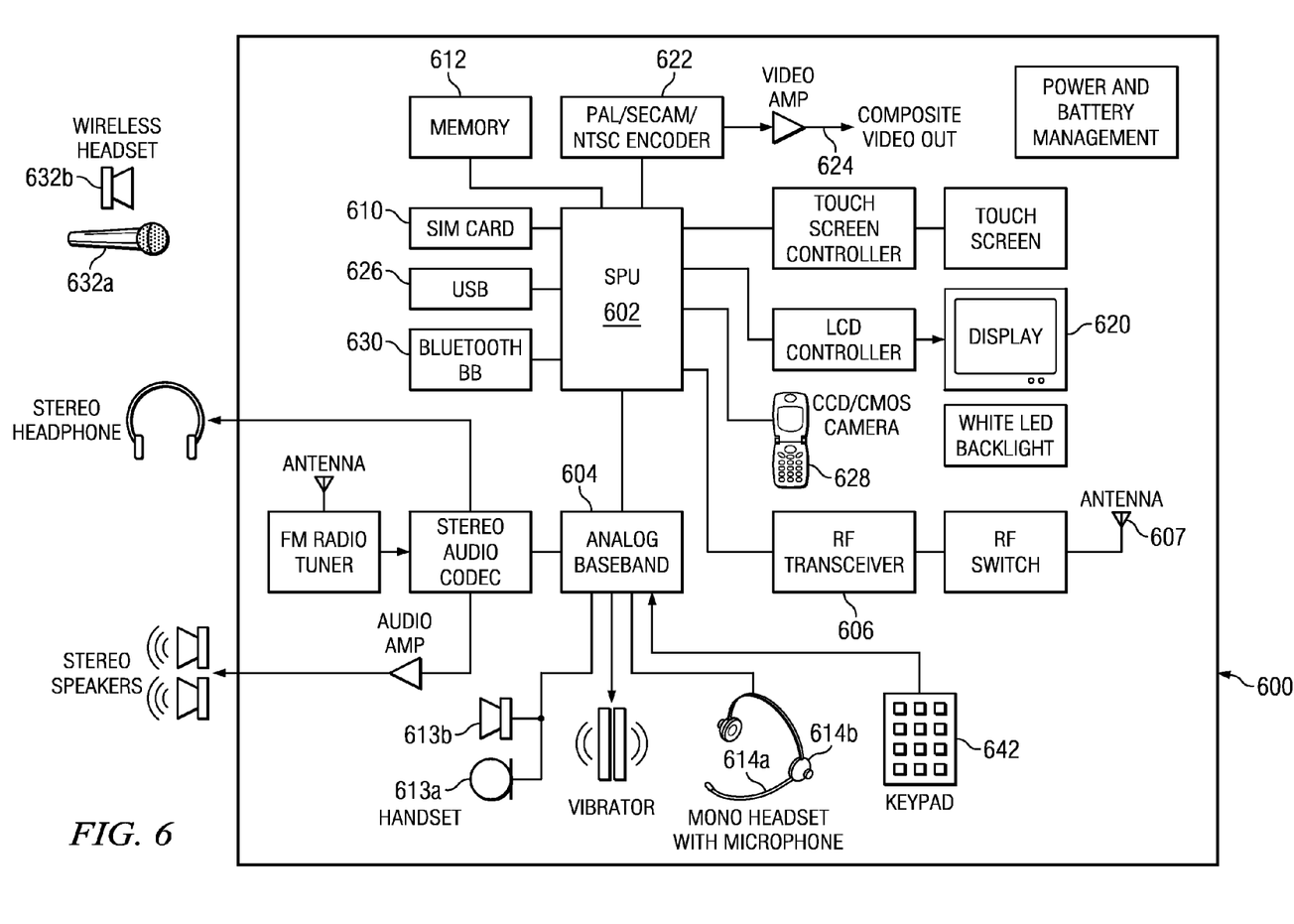
Figure 7:
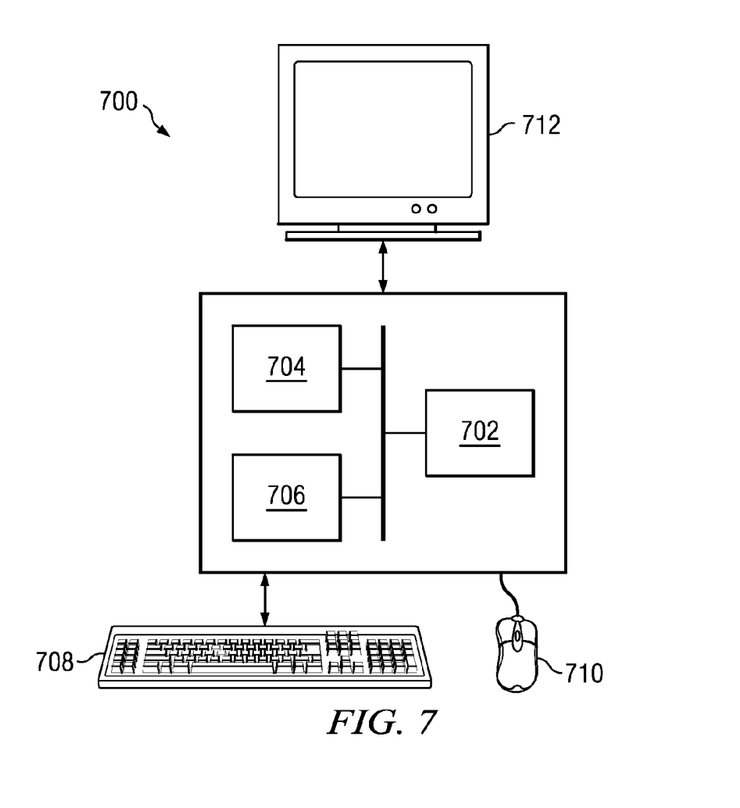

Embodiments of the methods and encoders for adaptive coding structure determination and adaptive fcode determination as described herein may be implemented for virtually any type of digital system (e.g., a desk top computer, a laptop computer, a handheld device such as a mobile (i.e., cellular) phone, a personal digital assistant, a digital camera, etc.) with functionality to capture or otherwise generate digital video sequences. FIGS. 5-7 show block diagrams of illustrative digital systems.

FIG. 5 shows a digital system suitable for an embedded system (e.g., a digital camera) in accordance with one or more embodiments of the invention that includes, among other components, a DSP-based image coprocessor (ICP) (502), a RISC processor (504), and a video processing engine (VPE) (506) that may be configured to perform methods as described herein. The RISC processor (504) may be any suitably configured RISC processor. The VPE (506) includes a configurable video processing front-end (Video FE) (508) input interface used for video capture from imaging peripherals such as image sensors, video decoders, etc., a configurable video processing back-end (Video BE) (510) output interface used for display devices such as SDTV displays, digital LCD panels, HDTV video encoders, etc, and memory interface (524) shared by the Video FE (508) and the Video BE (510). The digital system also includes peripheral interfaces (512) for various peripherals that may include a multimedia card, an audio serial port, a Universal Serial Bus (USB) controller, a serial port interface, etc.

The Video FE (508) includes an image signal processor (ISP) (516), and a 3A statistic generator (3A) (518). The ISP (516) provides an interface to image sensors and digital video sources. More specifically, the ISP (516) may accept raw image/video data from a sensor (CMOS or CCD) and can accept YUV video data in numerous formats. The ISP (516) also includes a parameterized image processing module with functionality to generate image data in a color format (e.g., RGB) from raw CCD/CMOS data. The ISP (516) is customizable for each sensor type and supports video frame rates for preview displays of captured digital images and for video recording modes. The ISP (516) also includes, among other functionality, an image resizer, statistics collection functionality, and a boundary signal calculator. The 3A module (518) includes functionality to support control loops for auto focus, auto white balance, and auto exposure by collecting metrics on the raw image data from the ISP (516) or external memory.

The Video BE (510) includes an on-screen display engine (OSD) (520) and a video analog encoder (VAC) (522). The OSD engine (520) includes functionality to manage display data in various formats for several different types of hardware display windows and it also handles gathering and blending of video data and display/bitmap data into a single display window before providing the data to the VAC (522) in YCbCr format. The VAC (522) includes functionality to take the display frame from the OSD engine (520) and format it into the desired output format and output signals required to interface to display devices. The VAC (522) may interface to composite NTSC/PAL video devices, S-Video devices, digital LCD devices, high-definition video encoders, DVI/HDMI devices, etc.

The memory interface (524) functions as the primary source and sink to modules in the Video FE (508) and the Video BE (510) that are requesting and/or transferring data to/from external memory. The memory interface (524) includes read and write buffers and arbitration logic.

The ICP (502) includes functionality to perform the computational operations required for video encoding and other processing of captured images. The video encoding standards supported may include one or more of the JPEG standards, the MPEG standards, and the H.26x standards. In one or more embodiments of the invention, the ICP (502) is configured to perform the computational operations of methods as described herein.

In operation, to capture an image or video sequence, video signals are received by the video FE (508) and converted to the input format needed to perform video encoding. The video data generated by the video FE (508) is stored in then stored in external memory. The video data is then encoded by a video encoder and stored in external memory. During the encoding, a method for adaptive fcode determination and/or a method for coding structure determination as described herein may be used. The encoded video data may then be read from the external memory, decoded, and post-processed by the video BE (510) to display the image/video sequence.

FIG. 6 is a block diagram of a digital system (e.g., a mobile cellular telephone) (600) that may be configured to perform the methods described herein. The signal processing unit (SPU) (602) includes a digital signal processing system (DSP) that includes embedded memory and security features. The analog baseband unit (604) receives a voice data stream from handset microphone (613a) and sends a voice data stream to the handset mono speaker (613b). The analog baseband unit (604) also receives a voice data stream from the microphone (614a) and sends a voice data stream to the mono headset (614b). The analog baseband unit (604) and the SPU (602) may be separate ICs. In many embodiments, the analog baseband unit (604) does not embed a programmable processor core, but performs processing based on configuration of audio paths, filters, gains, etc being setup by software running on the SPU (602).

The display (620) may also display pictures and video streams received from the network, from a local camera (628), or from other sources such as the USB (626) or the memory (612). The SPU (602) may also send a video stream to the display (620) that is received from various sources such as the cellular network via the RF transceiver (606) or the camera (626). The SPU (602) may also send a video stream to an external video display unit via the encoder (622) over a composite output terminal (624). The encoder unit (622) may provide encoding according to PAL/SECAM/NTSC video standards.

The SPU (602) includes functionality to perform the computational operations required for video encoding and decoding. The video encoding standards supported may include, for example, one or more of the JPEG standards, the MPEG standards, and the H.26x standards. In one or more embodiments of the invention, the SPU (602) is configured to perform the computational operations of a method for adaptive fcode determination and/or a method for coding structure determination as described herein. Software instructions implementing the one or more methods may be stored in the memory (612) and executed by the SPU (602) as part of capturing and/or encoding of digital image data, e.g., pictures and video streams.

FIG. 7 shows a digital system (700) (e.g., a personal computer) that includes a processor (702), associated memory (704), a storage device (706), and numerous other elements and functionalities typical of digital systems (not shown). In one or more embodiments of the invention, a digital system may include multiple processors and/or one or more of the processors may be digital signal processors. The digital system (700) may also include input means, such as a keyboard (708) and a mouse (710) (or other cursor control device), and output means, such as a monitor (712) (or other display device). The digital system (700) may also include an image capture device (not shown) that includes circuitry (e.g., optics, a sensor, readout electronics) for capturing video sequences. The digital system (700) may include a video encoder with functionality to perform embodiments of a method for adaptive fcode determination and/or a method for coding structure determination as described herein. The digital system (700) may be connected to a network (714) (e.g., a local area network (LAN), a wide area network (WAN) such as the Internet, a cellular network, any other similar type of network and/or any combination thereof) via a network interface connection (not shown). Those skilled in the art will appreciate that the input and output means may take other forms.

Further, those skilled in the art will appreciate that one or more elements of the aforementioned digital system (700) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (700) via removable computer readable media (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. For example, although the pseudo code of Table 5 illustrates adapting vopfcodeforward, one of ordinary skill in the art will understand embodiments of the invention in which vopfcodebackward may be similarly adapted based on the subsequent P-frame. Accordingly, the scope of the invention should be limited only by the attached claims. It is therefore contemplated that the appended claims will cover any such modifications of the embodiments as fall within the true scope and spirit of the invention.

What is claimed is:

1. A method of encoding a digital video sequence, the method comprising:
    computing a motion vector (MV) histogram and a motion threshold for a first frame of the digital video sequence; and
    using the MV histogram and the motion threshold for one selected from a group consisting of adaptive fixed length code determination and adaptive coding structure determination, wherein the adaptive coding structure determination utilizes a b-frame when the amount of motion is low in the first frame and a p-frame when the amount of motion is high in the first frame;
    wherein computing the MV histogram comprising:
        determining a first number of non-intracoded macroblocks in the first frame having a mean motion vector with an x coordinate value exceeding a first threshold, wherein the first threshold is based on the fixed length code value used for the first frame;
        determining a second number of non-intracoded macroblocks in the first frame having a mean motion vector with an x coordinate value exceeding a second threshold, wherein the second threshold is based on the fixed length code value used for the first frame;
        determining a third number of non-intracoded macroblocks in the first frame having a mean motion vector with a y coordinate value exceeding the first threshold; and determining a fourth number of non-intracoded macroblocks in the first frame having a mean motion vector with a y coordinate value exceeding the second threshold.

2. The method of claim 1, wherein the first frame is encoded using the fixed length code value, and wherein the adaptive fixed length code determination comprises adapting the fixed length code value for a second frame in the digital video sequence based on the MV histogram and the motion threshold.

3. The method of claim 2, wherein adapting the fixed length code value comprises:
determining whether motion is high or low in the first frame using the MV histogram and the motion threshold;
decrementing the fixed length code value when motion is low in the first frame; and
incrementing the fixed length code value when motion is high in the first frame.

4. The method of claim 1, further comprising:
computing the first threshold and the second threshold based on the fixed length code value used for the first frame.

5. The method of claim 1, further comprising:
computing the motion threshold based on a number of non-intracoded macroblocks in the first frame and a number of non-zero motion vectors in the first frame.

6. The method of claim 1, wherein determining whether motion is high or low comprises:
determining motion is high when the second number or the fourth number exceeds the motion threshold; and
determining motion is low when the first number and the third number are both below the motion threshold.

7. The method of claim 1, wherein the first frame is a first predicted frame and is comprised in a first consecutive sequence of frames encoded according to a coding structure, and wherein adaptive coding structure determination comprises selecting a coding structure for a second consecutive sequence of frames based on the MV histogram and the motion threshold.

8. The method of claim 7, further comprising:
computing the motion threshold based on a number of non-intracoded macroblocks in the first predicted frame.

9. The method of claim 7, wherein selecting a coding structure comprises:
determining whether motion is high or low in the first predicted frame using the MV histogram and the motion threshold;
selecting a first coding structure as the coding structure for the second consecutive sequence of frames when motion in the first predicted frame is low and motion in a second predicted frame was low;
selecting a second coding structure as the coding structure for the second consecutive sequence of frames when motion in the first predicted frame is low and motion in the second predicted frame was high; and
selecting the second coding structure as the coding structure for the second consecutive sequence of frames when motion in the first predicted frame is high.

10. The method of claim 9, wherein the first coding structure is BBP and the second coding structure is PPP, wherein B is b-frame and P is p-frame.

11. A video encoder for encoding a digital video sequence, the video encoder comprising:
means for computing a motion vector (MV) histogram and a motion threshold for a first frame of the digital video sequence; and
means for using the MV histogram and the motion threshold for one selected from a group consisting of adaptive fixed length code determination and adaptive coding structure determination, wherein the adaptive coding structure determination utilizes a b-frame when the amount of motion is low in the first frame and a p-frame when the amount of motion is high in the first frame;
wherein computing the MV histogram comprising:
means for determining a first number of non-intracoded macroblocks in the first frame having a mean motion vector with an x coordinate value exceeding a first threshold, wherein the first threshold is based on the fixed length code value used for the first frame;
means for determining a second number of non-intracoded macroblocks in the first frame having a mean motion vector with an x coordinate value exceeding a second threshold, wherein the second threshold is based on the fixed length code value used for the first frame;
means for determining a third number of non-intracoded macroblocks in the first frame having a mean motion vector with a y coordinate value exceeding the first threshold; and
means for determining a fourth number of non-intracoded macroblocks in the first frame having a mean motion vector with a y coordinate value exceeding the second threshold.

12. The video encoder of claim 11, wherein the first frame is encoded using the fixed length code value, and wherein the adaptive fixed length code determination comprises adapting the fixed length code value for a second frame in the digital video sequence based on the MV histogram and the motion threshold.

13. The video encoder of claim 12, wherein adapting the fixed length code value comprises:
determining whether motion is high or low in the first frame using the MV histogram and the motion threshold; decrementing the fixed length code value when motion is low in the first frame; and incrementing the fixed length code value when motion is high in the first frame.

14. The video encoder of claim 11, wherein the first frame is a first predicted frame and is comprised in a first consecutive sequence of frames encoded according to a coding structure, and wherein adaptive coding structure determination comprises selecting a coding structure for a second consecutive sequence of frames based on the MV histogram and the motion threshold.

15. A digital system comprising:
a processor; and
a memory configured to store software instructions that when executed by the processor cause the digital system to perform a method of encoding a digital video sequence, the method comprising:
computing a motion vector (MV) histogram and a motion threshold for a first frame of the digital video sequence; and
using the MV histogram and the motion threshold for one selected from a group consisting of adaptive fixed length code determination and adaptive coding structure determination, wherein the adaptive coding structure determination utilizes a b-frame when the amount of motion is low in the first frame and a p-frame when the amount of motion is high in the first frame;
wherein computing the MV histogram comprising:
determining a first number of non-intracoded macroblocks in the first frame having a mean motion vector with an x coordinate value exceeding a first threshold, wherein the first threshold is based on the fixed length code value used for the first frame;

determining a second number of non-intracoded macroblocks in the first frame having a mean motion vector with an x coordinate value exceeding a second threshold, wherein the second threshold is based on the fixed length code value used for the first frame;

determining a third number of non-intracoded macroblocks in the first frame having a mean motion vector with a y coordinate value exceeding the first threshold; and determining a fourth number of non-intracoded macroblocks in the first frame having a mean motion vector with a y coordinate value exceeding the second threshold.

16. The digital system of claim 15, wherein the first frame is encoded using the fixed length code value, and wherein the adaptive fixed length code determination comprises adapting the fixed length code value for a second frame in the digital video sequence based on the MV histogram and the motion threshold.

* * * * *